March 1, 1932.                A. I. MARCUM                1,847,348
        TORQUING AND DRIVE ARRANGEMENTS FOR MULTIPLE WHEEL ROAD VEHICLES
                    Original Filed April 5, 1926    2 Sheets-Sheet 1
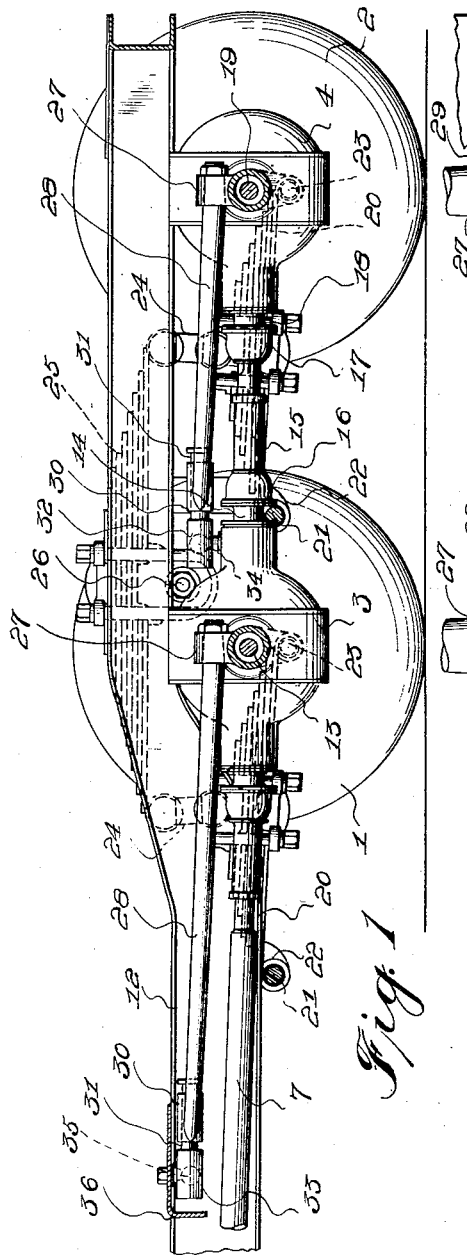
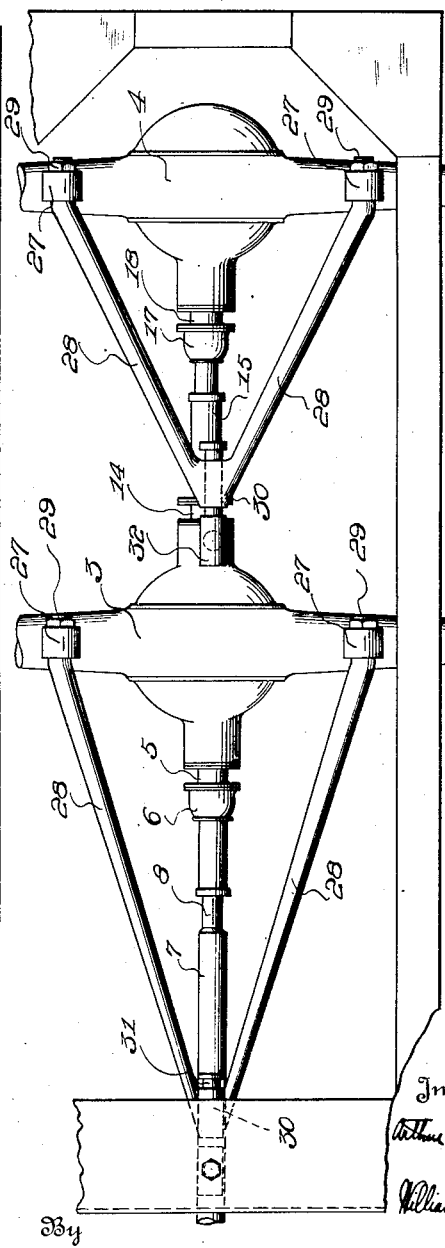

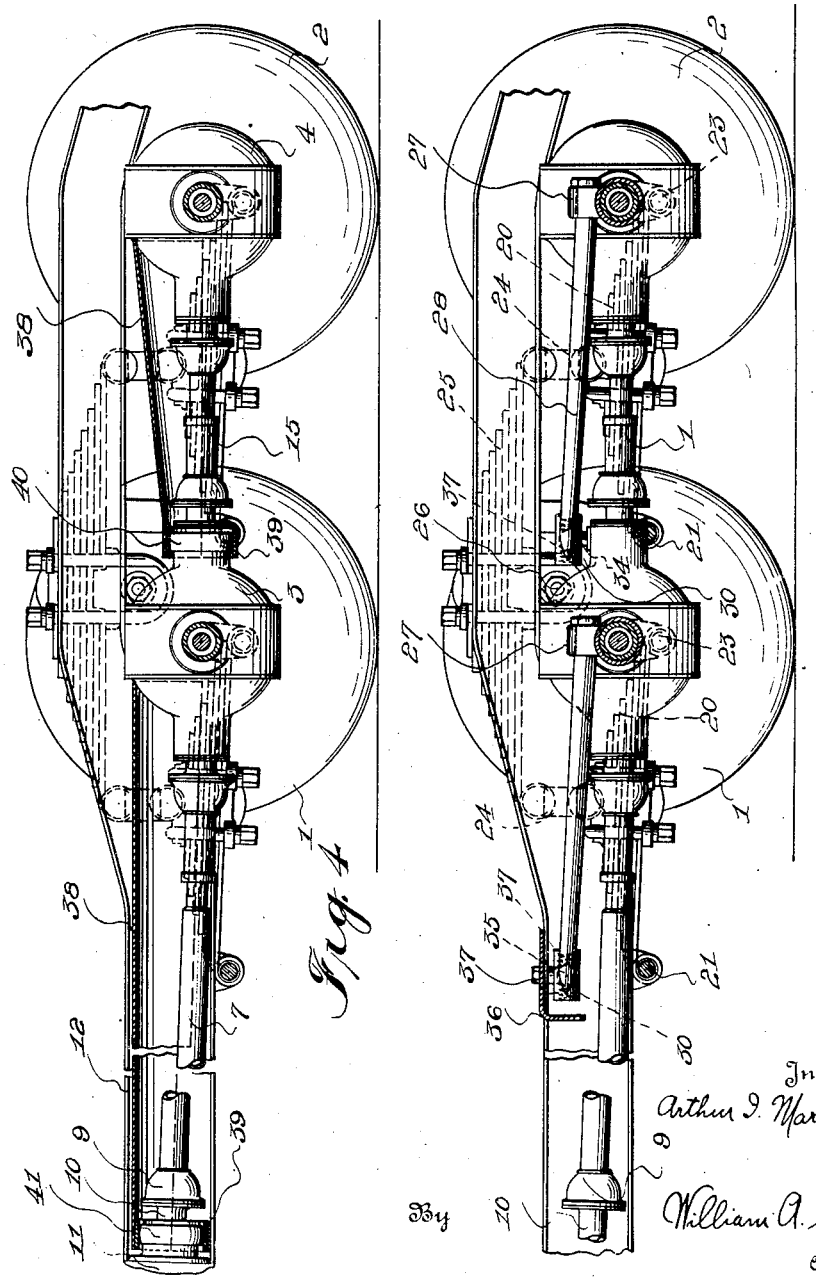

Patented Mar. 1, 1932

1,847,348

UNITED STATES PATENT OFFICE

ARTHUR I. MARCUM, OF OAKLAND, CALIFORNIA, ASSIGNOR, BY MESNE ASSIGNMENTS, TO AUTOMOTIVE ENGINEERING CORPORATION, A CORPORATION OF DELAWARE

TORQUING AND DRIVE ARRANGEMENTS FOR MULTIPLE WHEEL ROAD VEHICLES

Application filed April 5, 1926, Serial No. 99,831. Renewed July 17, 1931.

The present invention relates to improvements in torquing and drive arrangements for multiple wheel road vehicles.

More particularly the invention relates to improvements in road vehicles with more than two supporting axles, with the supporting axles arranged in tandem or pairs. As is now well known to provide successful road vehicles with tandem drive axles, it is essential to permit the axles to move freely with relation to the frame of the vehicle in a manner that will not substantially restrict the deflections of the springs as the wheels pass over road irregularities, so that the road shocks are absorbed by the springs without transmission from one tandem axle to the other, or to the frame, otherwise than through the deflecting springs. At the same time the tendency for the axle housings to rotate about the wheel centers due to the driving and braking torque reactions must be resisted. In my co-pending application filed September 4, 1925, Serial Number 54,560, I have shown a multiwheel road vehicle in which the necessary flexibility, spring deflections, and axle movements for successful road vehicles are permitted, and the present invention provides a rear end construction, which may in practice be substituted for the rear end construction disclosed in my co-pending application. In my above mentioned co-pending application, the torque reactions are resisted by an expansible and contractible torque tube construction which interconnects parallel drive axle housings substantially at their center permitting the necessary vertical rotary movements of the axles with relation to the frame without setting up strains in the torquing connections or restricting the flexibility of the springs.

Other torquing arrangements have been proposed in which the torque reactions have been transmitted to the frame or to the axles through torque arms secured to the axle housings at points substantially removed from the center of the vehicle. In torquing arrangements of this kind, the torque reactions set up relatively great tortional strains in the housing because of the distance from the center of the housing at which the torque is resisted. The arrangement of torquing arms substantially off the center of the axle housing restricts the vertical rotary movements of the axles, the flexibility of the spring suspensions, and axles which limit the life thereof.

In the torquing arrangements such as shown in my co-pending application in which the torque is resisted independently of the frame, a force couple is set up by the driving torque reactions which tends to raise the forward axle of a pair of driving axles and to rotate the forward axle about the rear axle reducing the traction of the forward axle. When a compensated drive is utilized with a differential mechanism between the driving differentials for the forward and rear axle shafts under slippery road conditions and when heavy driving torque is utilized, complete loss of traction may result due to slipping of the forward wheels.

Accordingly an object of the present invention is to provide improved torque resisting interconnections between tandem drive axles in which the flexibility of the spring suspensions and axle movement is not substantially restricted by the torquing interconnections, and at the same time the tendency to raise the forward axle of the pair is minimized.

Another object of the invention is to provide torquing arrangements for tandem drive axles in which the torque reactions of the rear driving axles are transmitted to the housing of the forward drive axle in a manner to resist the torque reactions of the forward driving axle, and in which the unbalanced torque reactions of the forward driving axle and the tendency to raise the forward axle is resisted on the frame of the vehicle.

Still further objects of the invention are such as may be attained by utilization of the various combinations, subcombinations and principles hereinafter more fully disclosed and as defined by the terms of the appended claims.

Referring to the drawings:

Figure 1 is a sectional side elevation of a preferred embodiment of the invention.

Figure 2 is a fragmental plan view showing the essential elements of the form of invention shown in Figure 1.

Figure 3 is a sectional side elevation of a modified form of the invention.

Figure 4 is a sectional side elevation of still a further modification of the invention.

As shown in Figures 1 and 2, the intermediate driving wheels 1 and the rear driving wheels 2 support and are driven by the axles 3 and 4. The axle 3 is preferably a through drive axle, such for example as is shown in my co-pending application Serial Number 705,482, filed April 10th, 1924, now Patent No. 1,670,119, dated May 15, 1928, in which a compensating differential mechanism is driven by the propeller shaft section 5, which in turn is driven through the universal joint 6 by the propeller shaft 7. The propeller shaft 7 is provided with a telescopic splined joint 8 and the forward end thereof is driven through a universal joint 9 as shown in Figure 3. The universal joint 9 is driven by a propeller shaft section 10 which is in turn supported in a bearing 11, rigidly secured to the frame 12 of the vehicle, for example, as shown in my co-pending application Serial Number 54,560, filed September 4, 1925. As will more fully appear from co-pending application Serial Number 705,482, the compensating differential in the axle 3 divides the power from the propeller shaft section 5 between the axle shafts 13 which drive the intermediate wheels 1 and the through drive shaft section 14. The intermediate drive shaft section 14 drives a telescopic intermediate driving shaft 15, through the universal joint 16, and the intermediate shaft 15 through a universal joint 17 drives the propeller shaft section 18 of the rear differential axle 4 supplying the driving power to the rear axle shafts 19. The frame 12 is supported from the axles 3 and 4 by means of any well known type of spring suspension. As indicated in the drawings, a cantilever type of compensating spring suspension such as shown in my co-pending application Serial Number 68,298, filed November 11th, 1925, now Patent No. 1,745,432, dated Feb. 4, 1930, are preferably utilized. Spring suspensions of the type shown in my co-pending application Serial Number 32,357, filed May 23, 1925, now Patent No. 1,745,431, dated Feb. 4, 1930, or any other well known spring suspensions may be used in obvious manner.

As shown in Figure 1, the preferred spring suspension comprises a pair of leaf springs 20 pivotally connected by the pins 21 at their forward ends to the brackets 22 which are secured to the side members of the frame 12, and springs 20 at their rear ends and are pivotally connected by means of the pins 23 to suitable securing projections of the axles 3 and 4. The springs 20 are connected at their mid portions by means of the pivoted links 24 to the ends of the equalizing spring 25 which is pivotally connected at 26 to the frame.

Provided on the axle housings 3 and 4 spaced a substantial distance from the centers of the axles, are the upstanding lugs 27. Lugs 27 are provided with tapered holes into which the tapered ends of the torque resisting arms 28 extend (see Figure 1) and are rigidly secured by means of the securing nuts 29 threaded on the protruding ends of the arms 28. The arms 28 are joined at their forward ends in a section 30 which is provided with a bore fitting slidably and rotatably on the cylindrical section 31 of securing members 32 and 33. The securing member 32 is connected by means of a ball and socket or universal joint 34 to the rear extension of the axle housing 3 in which the through drive shaft section 14 is journalled. The member 33 is connected by means of the ball and socket connection 35 to a frame cross member 36 which is rigidly supported from the side members of the frame 12.

In operation of this form of device, as the vehicle passes over road irregularities, the housings of axles 3 and 4 tend to rotate clockwise as viewed in Figure 1, due to the driving torque reaction. The torque reactions on the axle housings 4 are transmitted through arms 28 and the telescopic connection at 30 to the member 32 and through the universal joint 34 to the housing of axle 3, tending to rotate the housing of axle 3 counter clockwise and to neutralize the driving torque of the forward axle. The tendency for the forward axle housing 3 to rotate is further resisted by the torque arm 28 and the connection 33 through which the torque reactions are transmitted through the ball and socket or universal joints 35 to the frame member 36.

It will be seen that the telescoping connections between arms 28 and the members 32 and 33 will permit free movement of the axles 3 and 4 independently of each other and with horizontal and vertical rotary motions with relation to the frame, as the vehicle passes over road irregularities, without restricting the deflections of the springs while at the same time the tendency for axle housings to rotate about the rear wheel centers is resisted without setting up a substantial force couple tending to rotate the front axle upward about the rear axle.

In the form of invention shown in Figure 3, the arrangement as shown in Figures 1 and 2 is modified by positioning the ball or universal joints 34 and 35 approximately directly above the forward spring pins 21 and at a height equal to the vertical distance between the pins 23 and the rear ends of the arms 28. In this form of invention the sections 30 connecting the torque arms 28 are connected directly to the ball or universal joints 34 and 35 and the inclination and arrangement of parts is such that a parallel motion of the axles about the pins 21 at 34 and 35 occurs as the axles move with relation to the frame under road conditions. Because of the substantially parallel motion there will be no tendency for the distance between the points 34 and 35 and the projections 27 of the axles to vary due to oscillations of the axles and the variation of this distance will be due solely to spring deflections. To compensate for movement caused by spring deflections, the balls 34 and 35 may be seated between the helical springs 37 disposed in the sections 30 of the torquing members so that when movement of the axles occurs due to the spring deflections, the helical spring 37 will yield sufficient to absorb the shocks and to prevent restriction of the flexibility of the springs.

In the form of invention shown in Figure 4, the torquing arrangements in Figures 1 to 3 are eliminated and inverted U or trough shaped torque resisting members are substituted therefor. The members 38 are rigidly secured at their rear ends to the differential or gear supporting caps of the axles 3 and 4, and extending over and covering the intermediate shaft sections 15 and the propeller shaft section 7. Members 38 form a protecting cover for the driving shaft parts and at the same time permit access to the driving shaft parts from underneath of the vehicle. The forward ends of the members 38 have secured integrally thereto the rings or collars 39 which fit over the spherical seats 40 and 41 provided on the housing of axle 3 and on an extension of the frame supporting bearing 11. The collars 39 on the spherical seats 40 and 41 form sliding connections capable of universal movement for the ends of the torque resisting members 38. It will be apparent that the torque reactions of the rear axle housing 4 tend to raise the seat 40, causing counter clock-wise rotation of the axle housing 3 which in turn is resisted by the torque reaction of the axle housing 3 and reaction of the torque resisting member 38 secured to the housing 3 which will also transmit the torque reactions through the seats 41 to the bearing 11 and the frame 12.

Having described the preferred embodiments of my invention, what is desired to be secured by Letters Patent and claimed as new is:

1. In a vehicle having tandem driven axles supported in housings that are connected to the vehicle frame by springs permitting movement of said housings relative to said frame and to each other, a torque resisting means, comprising a structure, extensible longitudinally of the frame, connected to a point on one axle housing and to points spaced substantially in a direction endwise of the other housing.

2. In the combination defined in claim 1 in which the single point connection with one housing is a connection permitting universal movement.

3. In the combination defined in claim 1 in which the single point connection with one housing is substantially on the longitudinal center line of the vehicle frame.

4. In a vehicle having tandem driven axles supported in housings that are connected to the vehicle frame by springs permitting movement of said housings relative to said frame and to each other, a torque resisting means comprising a V-shaped member arranged in a substantially horizontal plane and rigidly attached to one of said housings at the ends of the legs of the V, and a second member slidably connected to the bight of the V and attached to the other housing by a universal connection.

5. In a vehicle having tandem driven axles supported in housings that are connected to the vehicle frame by springs permitting movement of said housings relative to said frame and to each other, a torque resisting means comprising a rigid member attached at one of its ends to one of the housings at points substantially spaced apart transversely of said frame, and at its other end to a member secured to the other housing by a universal connection arranged substantially on the central longitudinal axis of the vehicle frame, and connected to said first named member by a sliding joint that permits relative endwise movement between said members.

6. In a vehicle having tandem driven axles supported in housings that are connected to the vehicle frame by springs permitting movement of said housings relative to said frame and to each other, a torque resisting connection between said housings and a torque resisting means between one of said housings and the frame, said last named means comprising a structure that is rigidly secured to the housing at points substantially spaced apart lengthwise of said housing at one end and its other end slidably connected to a second member that is secured to said frame by a universal connection.

7. In a vehicle having tandem driven axles, means to resist the torque tending to revolve one axle about the other, comprising a structure rigidly secured to one of the axles at spaced points and to the other axle at a point approximately on the central longitudinal axis of the vehicle frame, said structure being extensible endwise.

8. A road vehicle including tandem driven axles, each axle being supported by a pair of wheels, a frame, springs resiliently connecting said axles and frame, the axles being connected to said frame and to each other so that each axle is free to swing bodily independently of the other axle in the path of movement of the spring at the point of connection between the spring and said axle and torque resisting means designed to resist the torque tending to rotate said axles about their axes comprising a V-shaped frame rigidly connected at the end of the legs of the V to an axle and connected at its opposite end to said frame by an element that is slidably connected to the bight of the V and connected to said frame by a universal joint.

In testimony whereof I affix my signature.

ARTHUR I. MARCUM.